(12) United States Patent
McIntyre et al.

(10) Patent No.: US 10,359,331 B2
(45) Date of Patent: Jul. 23, 2019

(54) TIRE PRESSURE MONITORING WITH AUTO-SCALING PRESSURE RESOLUTION

(71) Applicant: Continental Automotive Systems, Inc., Auburn Hills, MI (US)

(72) Inventors: Matthew D. McIntyre, New Baltimore, MI (US); Jean-Christophe Deniau, Fenton, MI (US); Brian Farrell, Troy, MI (US); Yasser Gad, Macomb, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 703 days.

(21) Appl. No.: 14/195,024

(22) Filed: Mar. 3, 2014

(65) Prior Publication Data
US 2014/0245825 A1 Sep. 4, 2014

Related U.S. Application Data

(60) Provisional application No. 61/772,424, filed on Mar. 4, 2013.

(51) Int. Cl.
*B60C 23/02* (2006.01)
*G01L 17/00* (2006.01)
*B60C 23/04* (2006.01)

(52) U.S. Cl.
CPC .......... *G01L 17/00* (2013.01); *B60C 23/0474* (2013.01); *B60C 23/0477* (2013.01)

(58) Field of Classification Search
CPC ......... G01L 17/00; G01L 7/00; B60C 23/061; B60C 23/0474; B60C 23/0477; G01M 17/022; G01N 3/40

USPC ...................... 73/146.3, 146.2, 146, 700, 78
See application file for complete search history.

(56) References Cited

U.S. PATENT DOCUMENTS 6,810,727 B1 * 11/2004 Davis .................. B60C 23/0408
73/146.2
7,197,422 B2 * 3/2007 Gaunt ................... B60C 23/001
116/34 R
7,398,668 B2 * 7/2008 Nordmeyer ............ B60G 11/15
73/1.13

(Continued)

FOREIGN PATENT DOCUMENTS

DE    10038804 C1    2/2002
DE    112004000985 T5    4/2006
DE    102007003861 A1    7/2008

OTHER PUBLICATIONS

German Office Action dated Oct. 31, 2018 related to German Patent Application No. 102014203836/.

*Primary Examiner* — Harshad R Patel
*Assistant Examiner* — Nigel H Plumb

(57) ABSTRACT

The present disclosure relates to methods, system and devices for monitoring tire pressure data of vehicle wheel units. In an example a method of monitoring and expressing tire pressure data information is provided. The method includes selecting a first threshold pressure value for a tire to establish a first pressure range and a second pressure range. The method also includes monitoring pressure of the tire and generating signals indicative of tire pressure. The method further includes that in the first pressure range the signals are converted to digital signals according to a first conversion variable and in the second pressure range the signals are converted according to a second conversion variable.

20 Claims, 4 Drawing Sheets

(56) References Cited

U.S. PATENT DOCUMENTS

| | | | | |
|---|---|---|---|---|
| 7,880,595 B2* | 2/2011 | Shimura | ............... | B60C 23/007 340/431 |
| 2009/0033478 A1* | 2/2009 | Deniau | ............... | B60C 23/0408 340/442 |
| 2011/0140876 A1* | 6/2011 | Deniau | ............... | B60C 23/0408 340/445 |
| 2011/0205047 A1* | 8/2011 | Patel | ................... | B60C 23/0401 340/447 |

* cited by examiner

TIRE PRESSURE MONITORING WITH AUTO-SCALING PRESSURE RESOLUTION

This application claims the benefit of U.S. Provisional Application No. 61/772,424, filed Mar. 4, 2013.

TECHNICAL FIELD

The present disclosure relates to methods, systems and devices for monitoring tire pressure.

DETAILED DESCRIPTION

Figure 1:
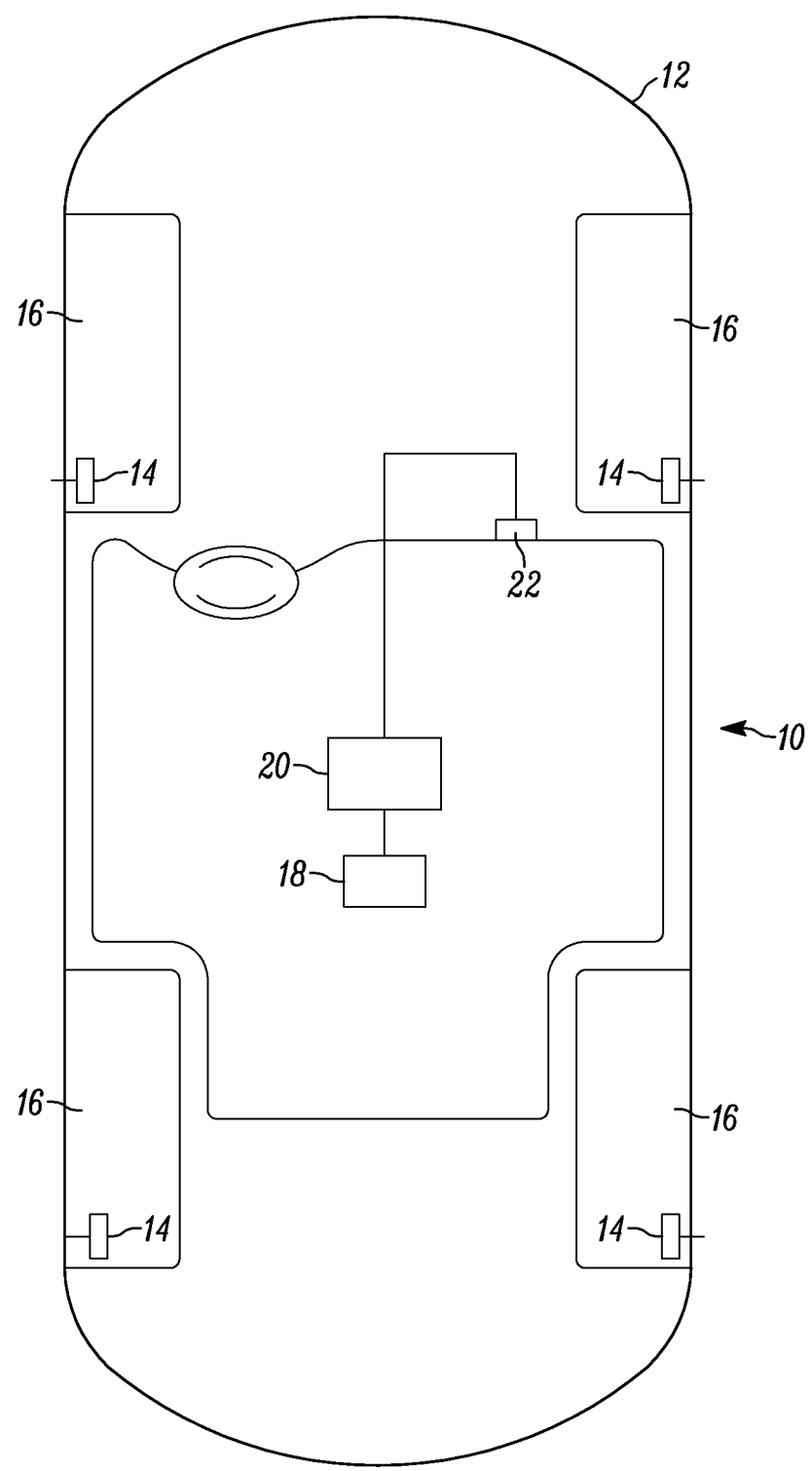
FIG. 1 illustrates a top view of a vehicle including a tire pressure monitoring system.

Systems, methods and devices are provided for monitoring tire pressure of a vehicle and transmitting signals indicative of such monitored tire pressure to a control unit of the vehicle. In an example, the system includes a tire pressure monitoring wheel unit configured for monitoring tire pressure of, for example, passenger vehicle tires, e.g. properly inflated to less than about 60 psi of inflation pressure, heavy duty vehicle tires, e.g. properly inflated to greater than about 60 psi of inflation pressure. Other vehicle tire types and pressure ranges are contemplated. Further, the tire pressure monitoring wheel unit is particularly suitable for multipurpose vehicles that operate under different load configurations including passenger configuration, mid-load configurations, heavy load configurations, dual placards or otherwise. This feature alleviates the requirement to change pressure monitoring wheel units, e.g. replace by one or more different tire pressure monitoring wheel units, each time the vehicle or wheel is utilized for a different application. As should be appreciated, since the tire pressure wheel units are often used in each tire the need to change multiple wheel units for each change in use or application of the vehicle is substantially reduced or eliminated.

Furthermore, this feature reduces the need to stock different types of tire pressure monitoring wheel units for multiple applications. In particular, a single tire pressure monitoring wheel unit can be mounted to operate, for example, in a low pressure application, a high pressure application, or in a dual placard application. Also, the tire pressure monitoring wheel unit can be repurposed from one application to another. As should be appreciated, since one tire pressure monitoring wheel unit can be installed to function in multiple applications the need to stock different types of tire pressure monitoring wheel units is reduced.

The tire pressure monitoring system includes suitable software for controlling the signals transmitted by a pressure sensor of the tire pressure monitoring wheel unit so as to be conformable into a digital manner suitable for transmitting to a control unit of the vehicle. For example, due to wireless transmission regulations, signals transmitted by tire pressure monitoring wheel units must be transmitted within certain time frames thereby requiring data to be compact. With respect to pressure data, typically the amount of transmission data is 1 byte or 256 bits, which in turn provides for about 255 discrete pressure indications that can be transmitted with one datum being reserved for an error code. Depending on the resolution of the tire pressure being transmitted, e.g. 0.2 psi, 0.4 psi or otherwise, the range of the pressure data which can be transmitted varies but is limited.

The signals are also controlled to be particularly suited for the pressure range of a passenger vehicle, heavy duty vehicle, dual placard vehicle, or otherwise. In an example, the tire pressure monitoring wheel unit includes two or more pressure ranges within which the wheel unit can operate. The tire pressure monitoring wheel unit monitors the inflation pressure within an associated tire and determines which pressure range is more suitable given inflation pressure as a trigger. In an example, the tire pressure monitoring wheel unit begins in a low pressure range. Should the tire pressure monitoring wheel unit detect a pressure outside or above the low pressure range, a trigger, the wheel unit automatically changes the operating range to be able to monitor fluctuations of the tire pressure for the given application and pressure range. In a particular example, once the pressure range is changed to a high pressure range, or otherwise, the pressure range of the wheel unit is locked into the particular range. This locking feature ensures that should the pressure of the tire fall out of the particular pressure range, the wheel unit does not merely change the range, but instead, it will notify the user that the tire pressure is outside of the range selected by the user.

However, in another example the tire pressure wheel unit is capable of having the range of the wheel unit changed or reset by a trigger, such as to a lower pressure range or otherwise. In a configuration, the pressure range of the wheel unit may be changed by subjecting the wheel unit to pressure indicative of ambient pressures, such as, for example, 0 to 2 psi. Other configurations are possible. Once the wheel unit is reset triggered, the wheel unit operates under the assumption that it is once again a lower pressure wheel unit, or otherwise. In a particular example, the wheel unit transmits information to the control unit of the vehicle indicating which type of wheel unit it perceives itself as, e.g. low pressure, mid pressure, high pressure or otherwise, or indicates the pressure range under which it is operating. This is indicated by an appropriate pressure mode indicator, for example an appropriate bit, an appropriate flag, or a portion of the signal being transmitted to the control unit of the vehicle. In another example, this is achieved through the transmission of a different signal to the control unit of the vehicle, such as through an on-board diagnostic connector or otherwise. Regardless, this allows the control unit to ascertain the precise pressure of the wheel unit based upon the pressure range indicated by the tire pressure monitoring wheel unit.

Referring to FIG. 1, an example of a tire pressure monitoring system 10 (hereinafter TPMS) in vehicle 12 is shown. The TPMS 10 includes a plurality of tire pressure monitoring wheel units 14 (hereinafter TPM wheel unit) configured for monitoring inflation pressure within tires 16 of the vehicle 12 and generating signals indicative of the inflation pressure for each respective tire. The signals are received by a control unit 18 of the TPMS 10, electronic control unit 20 of the vehicle 12, or both. The electronic control unit 20 indicates to a user of the vehicle should the pressure of a particular tire 16 fall out of an acceptable range. However, the electronic control unit 20 may also indicate to a user of the vehicle the current tire pressures regardless of whether they are in or out of an acceptable range. The vehicle further includes an on-board diagnostic connector 22 for transmitting or receiving information pertaining to the vehicle, such as TPM wheel unit configuration, recorded data or otherwise.

Figure 2:
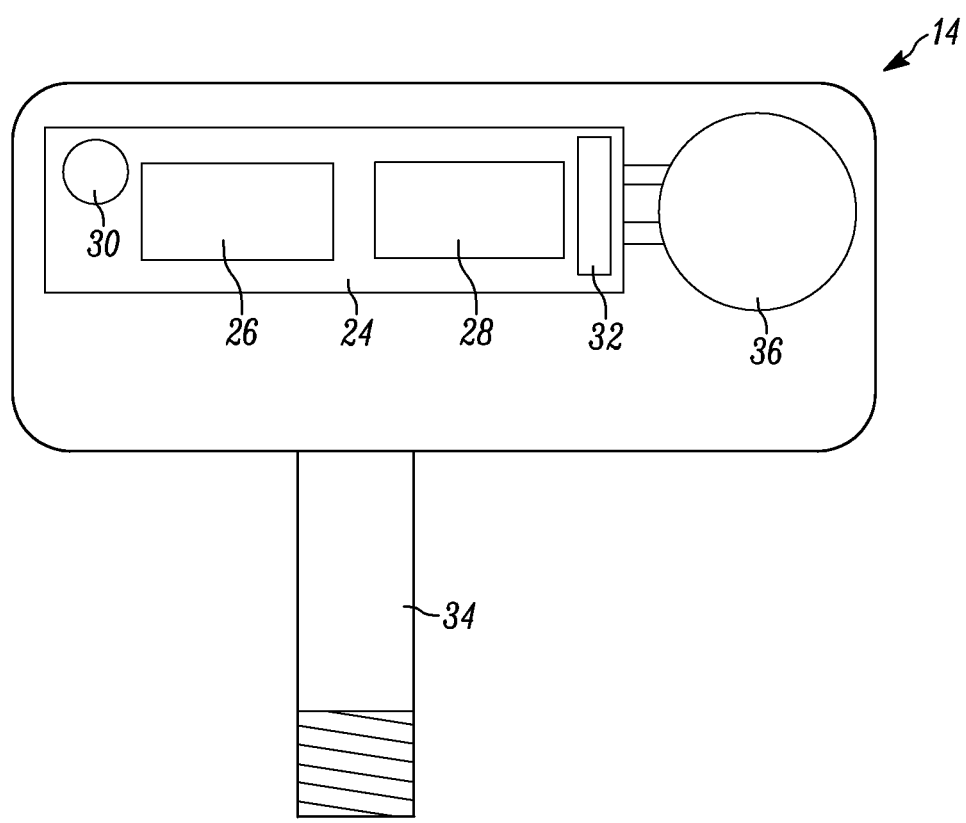
FIG. 2 illustrates a top view of a tire pressure monitoring wheel unit including an integrated circuit.

Referring to FIG. 2, an example of a TPM wheel unit 14 is shown. The wheel unit includes an integrated circuit board 24 including a processing unit 26, one or more computer-readable memory devices 28, pressure sensor 30 and wireless transmitter 32. The TPM wheel unit 14 may further include a valve stem 34 for inflation of an associated tire 16 and mounting of the TPM wheel unit to a rim of the tire. The TPM wheel unit 14 further includes a suitable power supply, such as battery 36, for providing power to various components of the integrated circuit board 24 including processing unit 26, wireless transmitter 32 or otherwise.

The pressure sensor 30 of the TPM wheel unit 12 generates signals indicative of inflation pressure within the associated tire. The signals are communicated to the processing unit 26. Data indicative of the signals are stored on the computer-readable memory device 28 of the TPM wheel unit 12. In an example, the pressure sensor 30 comprises an absolute pressure sensor which transmits pressure signals indicative of pressure relative to a vacuum. In another example, the pressure sensor 30 comprises a relative pressure sensor which transmits signals indicative of pressure relative to atmospheric pressure. Other configurations are possible.

The TPM wheel unit 14 operates according to the configuration of the processing unit 26 and software stored in the computer-readable memory device 28. At the onset, or after resetting or reconfiguration, for example through triggering, the TPM wheel unit 14 operates according to a preliminary, initial or first operating range, for example due to the fact that it is unaware of the application the vehicle 12 will be used for and what types of tire pressures it will encounter. In this stage, the TPM wheel unit 14 transmits signals to the control unit 18 or electronic control unit 20 that it is operating under this preliminary, initial or first operating range. In an example, this is indicated by the pressure mode indicator portion of transmission signals to the vehicle 12 by the TPM wheel unit 14. In another example, this is indicated through another signal, such as through the on-board diagnostic connector 22 or otherwise, that is transmitted to the control unit 18 or to the electronic control unit 20.

Figure 3:
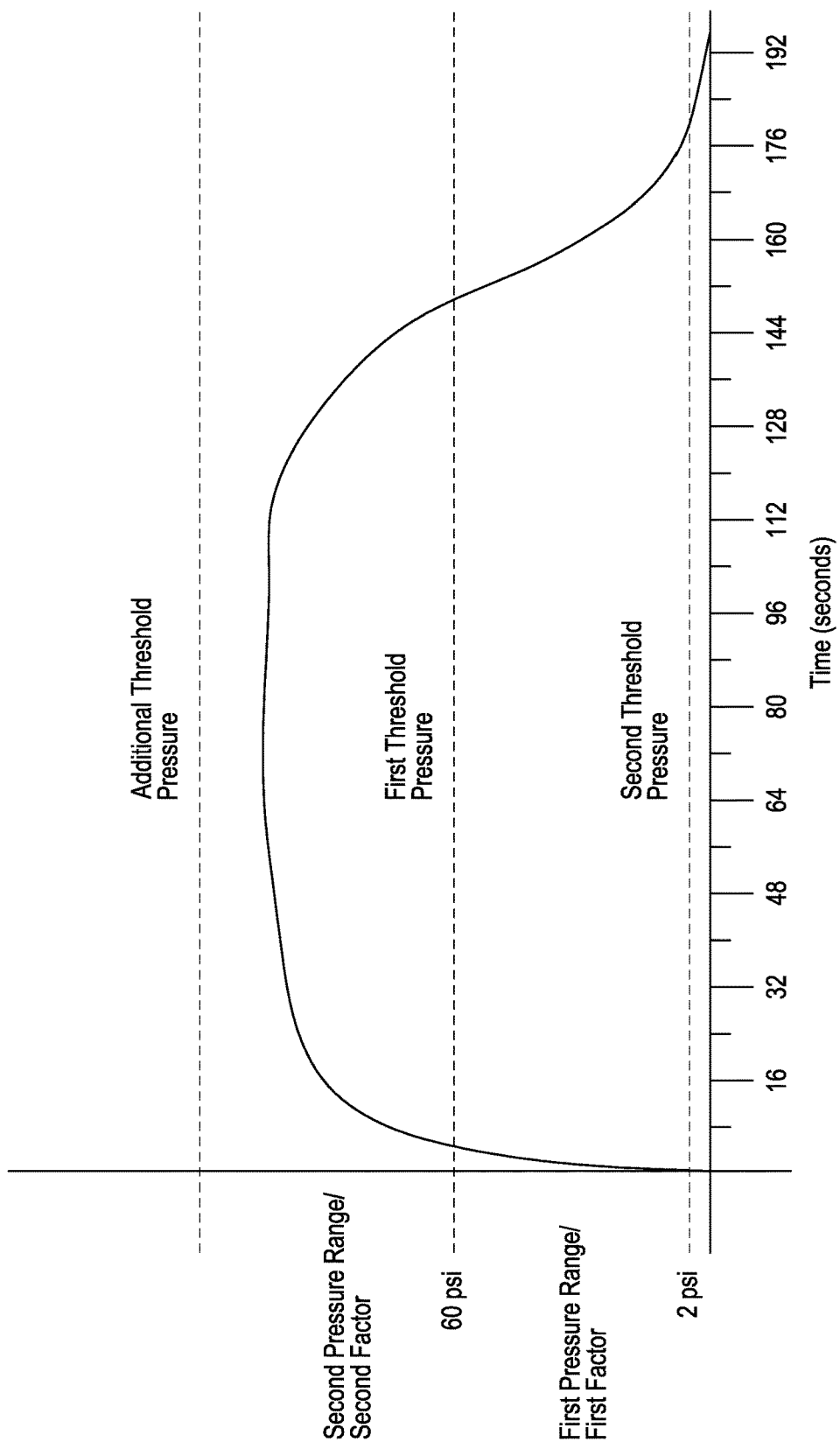
FIG. 3 illustrates a graph depicting multiple pressure ranges and pressure thresholds.

Through the processing unit 26 and software stored on the computer-readable memory device 28, the TPM wheel unit 14 is configured to operate according to multiple pressure ranges. In an example, referring to FIG. 3, the TPM wheel unit 14 is configured to operate according to 2 pressure ranges, a low pressure range and a high pressure range. In another example, the TPM wheel unit is configured to operate according to 3 ranges, a low pressure range, middle pressure range and high pressure range. It is contemplated that additional pressure ranges may be utilized including 4, 5, 6 or more pressure ranges. In an example, the pressure ranges formed by the TPM wheel unit 14 are not overlapping. However, in other examples the pressure ranges may overlap. Non-limiting examples of pressure ranges includes about 0-51 psi, about 0-63 psi, about 0-102 psi, about 0-114 psi, and about 0-127 psi. Other non-limiting examples of pressure ranges includes about 51-102 psi, about 51-114, or otherwise. It should be appreciated that the features of the present invention are capable of defining numerous pressure ranges which may be based upon offsets, resolution or scaling factors or combinations thereof.

The TPM wheel unit 14 includes one or more threshold pressures, for example triggers, that are used to define operating ranges of the wheel unit, e.g., whether the wheel unit should act as a wheel unit for applications that have pressures typically below 60 psi, whether the wheel unit should act as a wheel unit for an application that has pressure that can range up to 127 psi or more, or otherwise. The threshold pressure, trigger, also determines when one or more variables, e.g. offsets, resolution or scaling factors, or combinations thereof, are to be used by the TPM wheel unit in converting the signals generated by the pressure sensor 30 prior to transmission to the control unit 18 of the vehicle 12.

In an example, still referring to FIG. 2, the TPM wheel unit 14 includes a first threshold pressure, for example a trigger, defining a first pressure range and a second pressure range. In this configuration, the first pressure range defines a low pressure range below 60 psi, such as with passenger vehicles or otherwise, and the second pressure range defines a high pressure range above 60 psi, such as with heavy duty vehicles or otherwise. Non-limiting examples of first threshold pressures include about 52, psi, 57 psi, 60 psi, or otherwise.

In another example, the TPM wheel unit 14 includes a second threshold pressure, for example trigger, defining when pressure of an associated tire is at or near ambient pressure such as below 2 psi, indicating a flat, a removal of the tire or otherwise. In a configuration, once the pressure drops below the second threshold pressure the TPM wheel unit 14 resets or returns to the first operation range and associated variables, e.g. offsets, resolutions, scaling factors or combinations thereof. Non-limiting examples of second threshold pressures include about 0.5 psi, 1 psi, 2 psi or otherwise.

In yet another example, the TPM wheel unit 16 includes additional thresholds, triggers, for creating more than three pressure ranges and variables for determining and transmitting inflation pressure. Non-limiting examples of additional threshold pressures, triggers, include particular pressures between about 15 to 45 psi, between about 60-90 psi, greater than about 130 psi or otherwise. It is contemplated that these additional pressure threshold, triggers, may be application dependent such as off-road application, racing application, vehicle application (e.g. bicycles or motorcycles) or otherwise.

In an example, the threshold pressures, triggers, are configurable to allow an installer or service technician to configure the TPM wheel unit 14 for a particular application. For example, in a configuration the TPM wheel unit 14 is programmable or configurable through a programming or configuration tool to allow a service technician to record desired threshold pressures, triggers, based upon original equipment manufacturer requirements, government regulations, user application or otherwise.

The TPM wheel unit 14 is further configured for monitoring periods of time which the pressure is recorded or monitored above or below a threshold pressure, collectively triggers, which aids in reducing false readings, premature switching of pressure range, or even time for a technician or user to properly inflate a tire prior to tire pressure sensing. Examples of potential time delays or periods of time, comprised in triggers, prior to switching conversion variables of pressure include 8 seconds, 16 seconds, 32 seconds or otherwise. In a particular example, the pressure must be within another pressure range (such as second pressure range) for at least about 16 seconds prior to switching mode or pressure range. In another particular example, the pressure must be within or below another pressure range (such as below first pressure range) for at least about 32 seconds prior to switching mode or pressure range. Other configurations are possible. It should be noted, that in some examples, the time period triggering the mode or pressure range switch is in a mode or pressure range other than the one being switched to. Accordingly, in some non-limiting examples, the switch to an exemplary low pressure range, e.g. 0 to below about 57 psi, occurs when the TPM wheel unit operates in an exemplary reset range, e.g. 0-2 psi, for 32 continuous seconds, after being operated in an exemplary high pressure range, e.g. at least 57 psi, for more that 16 continuous seconds.

As previously indicated, the TPM wheel units 14 are configured, via processing unit 26 and software stored on the computer-readable memory device 28, to modify the signals received by the pressure sensor 30 according to conversion variables. The modification is based upon which pressure range the TPM wheel unit 14 resides within, which is further based upon passing threshold pressures for a pre-established amount of time, comprised in triggers. In an example, the conversion variable comprises a resolution setting comprising scaling factor. In another example, the conversion variable comprises an offset. In yet another example, the conversion variable comprises a combination of resolution setting and offset.

In greater detail, the resolution setting comprises a scaling factor to represent the pressure value with data resolution segments. As previously mentioned, the available data range for transmitting data to the control unit 18 from the TPMS 10 is 1 byte, which provides about 255 increments or 8 bits of resolution. Accordingly, the range of data is maximized at 255. As such, the lower the scaling factor, the smaller the pressure range, the higher the resolution and therefore the more precise the pressure signal received by the control unit 18. For example, a resolution of 1.0 would provide low precision but a pressure range of at least about 255 psi. A resolution of 0.5 would provide a better precision but a lower pressure range of at least about 127 psi. Still further, a resolution of 0.2 would provide still better precision but a pressure range of only about 51 psi. Accordingly, desired range of monitoring can be used to determine a desired resolution. Non-limiting examples of suitable scaling factors include 0.2, 0.25, 0.4, 0.45 and 0.5. However, other scaling factors are possible.

In an example, the scaling factor changes after the pressure readings exceed a pressure threshold for a predetermined amount of time. For example, in the first pressure range a scaling factor may comprise 0.2, which would provide 0-51 psi range. Once the pressure exceeds the first pressure threshold, the scaling factor can be changed to 0.4 changing the range to 0-102 psi. In this case, upper pressure readings are available for high pressure applications, e.g. heavy duty vehicles or otherwise.

In another example, the conversion variable comprises an offset which is added to the pressure to arrive to a shifted pressure reading. As previously mentioned, the available data range for transmitting data to the control unit 18 from the TPMS 10 is 1 byte, which provides 255 increments or 8 bits of resolution. Accordingly, the range of data is maximized at 255. Should the pressure increase past the first threshold for a predetermined period of time, trigger, an offset as described herein may change the range to 51-102 psi (which includes a 51 degree range). In this configuration an offset, such as 51 psi, is utilized to bring the pressure readings to 51-102 psi. It should be appreciated that various different offsets can be utilized to obtain a desired pressure range. Non-limiting examples of suitable pressure offsets include 51 psi, 57 psi, 60 psi, 62 psi or otherwise.

In another example, the conversion variable comprises a combination of a scaling factor and an offset. In an example, once the pressure passes a the threshold pressure for a predetermined amount of time, the trigger, the scaling factor is increased to expand the pressure range and an offset is used to bring the minimum pressure reading to higher pressure. For example, a combination of an offset of 57 psi and an increase of the scaling factor from 0.2 to 0.25 would change the pressure range from 0-51 psi to 57-120 psi (0+57 to 255×0.25+57). It should be appreciated that other configurations are possible.

With respect to the above conversion variable, once the threshold pressure has been passed for a predetermined amount of time, the trigger, and the system enters the next pressure range, e.g. second, third or otherwise, the system remains locked or latched into the next pressure range until another trigger is met. In an example, the another trigger is the next threshold pressure range being passed for a predetermined amount of time, wherein the system moves to the next pressure range. In another example, the trigger is the pressure falling below a minimal pressure threshold. In yet another example, the trigger is the pressure falling below a pressure which in a configuration is indicative of ambient pressure. In this configuration, once the pressure falls below the minimal pressure threshold the conversion variable, if any, returns to the original first pressure range and the first conversion variable.

In a configuration, the conversion variable and pressure thresholds can be set by the original equipment manufacturer or by a service technician.

Referring again to FIG. 3, an example of varying pressure ranges of a TPM wheel unit 12 is shown. In the example shown, the data pressure generated by the pressure sensor 30 is initially scaled to begin at zero psi. As pressure is increased in the tire 16, the pressure is within the first pressure range and pressure data is transmitted to the control unit 18 or electronic control unit 20 of the vehicle 12 according to the first conversion variable, which may comprise a scaling factor, an offset or both. As the pressure passes the first threshold pressure, e.g. 60 psi, for a predetermined amount of time, the trigger, the pressure within the second pressure range is converted according to the second conversion variable, which may comprise scaling factor, offset or both. Should the pressure fall below the first threshold pressure the second conversion variable remains latched or locked and the pressure data is continually transmitted to the vehicle according to the second conversion variable. However, should the pressure fall below the second threshold pressure as shown, e.g., minimal pressure threshold, for a predetermined amount of time, the trigger, the pressure data is transmitted to the vehicle according to the original and first conversion variable.

Figure 4:
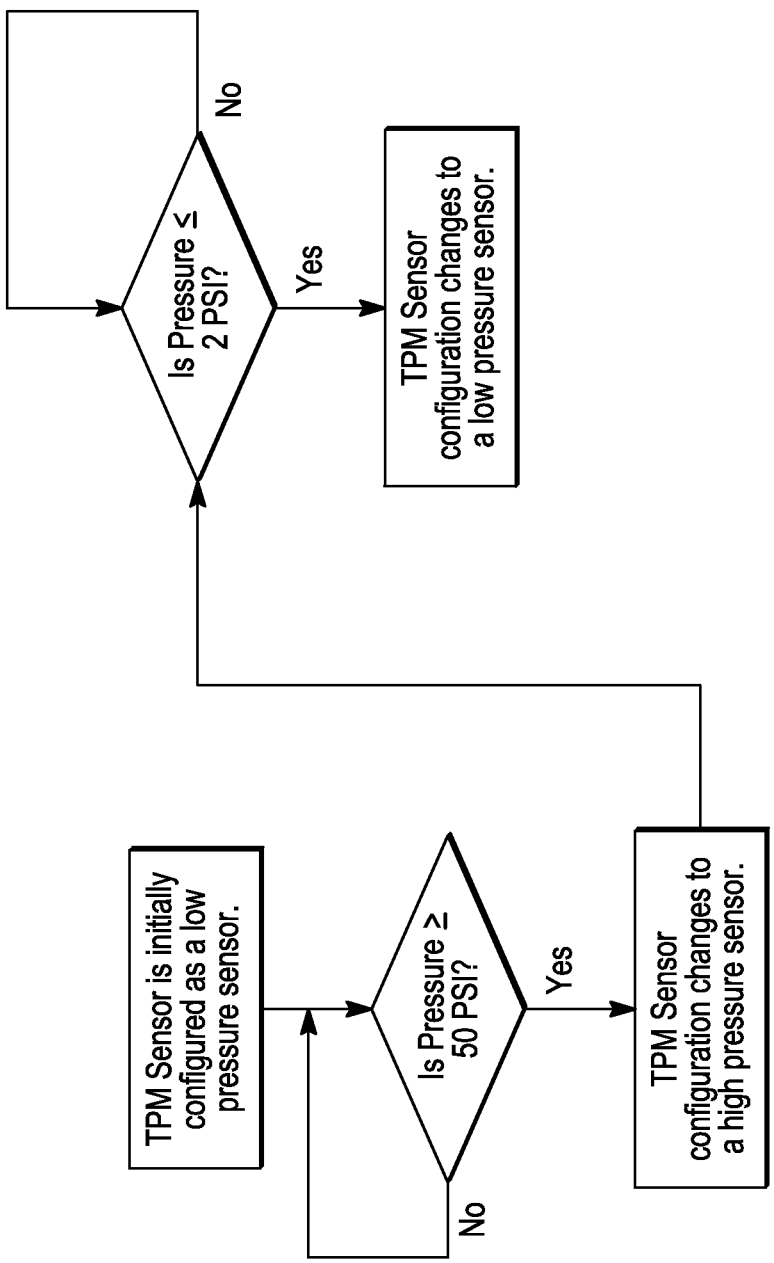
FIG. 4 illustrates a method flow chart demonstrating automatic pressure resolution.

Referring to FIG. 4, a flow chart of an exemplary method is shown. In this example, the TPM wheel unit 14 is initially configured in the first pressure range as a lower pressure sensor. Through the processing unit 26 and software on the computer-readable memory devices 28, the wheel unit compares the data provided by the pressure sensor 30 with the first threshold pressure, which in the present case is 50 psi. This is continually checked until it is determined that the pressure is above 50 psi. While the pressure is within the first and lower pressure range, the TPM wheel unit, via transmitter 32, transmits tire pressure data according to the first conversion variable.

Once the TPM wheel unit 14 determines that the pressure is above 50 psi, for the predetermined time period, the TPM wheel unit changes to the second pressure range and high pressure wheel unit. While the pressure is within the second and higher pressure range, the TPM wheel unit, via transmitter 32, transmits tire pressure data according to the second conversion variable. While in the second pressure range, the wheel unit compares the signal provided by the pressure sensor 30 with the second threshold pressure, which in this case is below 2 psi. This is continually checked until it is determined that the pressure is below 2 psi. Should the pressure fall below 2 psi, the TPM wheel unit 14 reverts back to the first pressure range and first conversion variable. It should be appreciated that changes between pressure ranges and conversion are automatic.

While the invention has been described with reference to a preferred embodiment it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the presented claims.

The invention claimed is:

1. A method of monitoring and expressing tire pressure data information, comprising the steps of:
    triggering a tire pressure monitoring system wheel unit, the triggering comprising passing a first threshold pressure value for a tire, the first threshold pressure value for a tire being selected to establish a first pressure range and a second pressure range;
    monitoring pressure of the tire and transmitting signals indicative of tire pressure and determining whether to notify a user that the tire pressure is outside of the second pressure range;
    wherein in the first pressure range the signals are converted according to a first conversion variable and in the second pressure range the signals are converted according to a second conversion variable, wherein the first and second conversion variables are of a type selected from the group consisting of a resolution, a scaling factor, and an offset, wherein the first and second conversion variables are of the same type and wherein at least one of the first and second conversion variables is configured to be suitable for a particular application of a vehicle control unit, wherein the tire pressure monitoring system wheel unit is a single tire pressure monitoring system wheel unit.

2. The method as described in claim 1, wherein once the tire pressure passes the first threshold pressure the signals are continually converted according to the second conversion variable until the tire pressure passes a second threshold pressure.

3. The method as described in claim 1, wherein the first conversion variable includes a first scaling factor and the second conversion variable includes a second scaling factor, the second scaling factor being greater than the first scaling factor.

4. The method as described in claim 1, wherein at least one of the first conversion variable and the second conversion variable includes an offset.

5. The method as described in claim 1, wherein at least one of the first conversion variable and the second conversion variable includes a scaling factor and an offset.

6. The method as described in claim 1, wherein the signals transmitted to the tire pressure monitoring system include an indication of whether the signals indicative of tire pressure are converted in one of the first pressure range and the second pressure range.

7. A tire pressure monitoring wheel unit, comprising:
    a pressure sensor configured for monitoring tire pressure and generating signals indicative thereof,
    a processing unit and memory device including suitable software for:
        defining a first pressure range and a second pressure range, and
        determining at least one of whether the tire pressure sensed by the pressure sensor triggers the first pressure range or the second pressure range and whether to notify the user that the tire pressure sensed by the pressure sensor is outside of the second pressure range,
        wherein in the first pressure range the signals are converted according to a first conversion variable and in the second pressure range the signals are converted according to a second conversion variable, wherein the first and second conversion variables are of a type selected from the group consisting of a resolution, a scaling factor, and an offset, wherein the first and second conversion variables are of the same type and wherein at least one of the first and second conversion variables is configured to be suitable for a particular application of a vehicle control unit, wherein the tire pressure monitoring system wheel unit is a single tire pressure monitoring system wheel unit; and
    a wireless transmitter configured to transmit the converted signals.

8. The wheel unit as described in claim 7, wherein the processor is configured to continually convert the signals according to the second conversion variable once the tire pressure triggers the second pressure range and until the tire pressure triggers the first pressure range.

9. The wheel unit as described in claim 7, wherein the first conversion variable includes a first scaling factor and the second conversion variable includes a second scaling factor, the second scaling factor being greater than the first scaling factor.

10. The wheel unit as described in claim 7, wherein at least one of the first conversion variable and the second conversion variable includes at least one of a scaling factor and an offset.

11. The wheel unit as described in claim 7, wherein the transmitter transmits an indication of whether the signals indicative of tire pressure are converted in one of the first pressure range and the second pressure range.

12. A computer-readable memory device storing computer program instructions which when executed by a computer comprising at least one processor comprised in at a tire pressure monitoring system wheel unit, result in:
    determining at least one of whether a measured pressure triggers a first pressure range or a second pressure range and whether to notify the user that the tire pressure sensed by the pressure sensor is outside of the second pressure range; and
    if the first pressure range is triggered, converting the measurement data according to a first conversion variable, and if the second pressure range is triggered, converting the measurement data by a second conversion variable, the second conversion variable being different from the first conversion variable, wherein the first and second conversion variables are of a type selected from the group consisting of a resolution, a scaling factor, and an offset, wherein the first and second conversion variables are of the same type and wherein at least one of the first and second conversion variables is configured to be suitable for a particular application of a vehicle control unit, wherein the tire pressure monitoring system wheel unit is a single tire pressure monitoring system wheel unit.

13. The computer-readable memory device as described in claim 12, wherein the program instructions when executed by a computer comprising at least one processor further result in, once the pressure triggers the second pressure range, the signals being continually converted according to the second conversion variable until the tire pressure triggers the first pressure range, and thereafter the signals being converted according to the first conversion variable.

14. The computer-readable memory device as described in claim 12, wherein the first conversion variable includes a first scaling factor and the second conversion variable includes a second scaling factor, the first and the second scaling factors being different.

15. The computer-readable memory device as described in claim 12, wherein the second conversion variable includes an offset.

16. The computer-readable memory device as described in claim 12, wherein the program instructions when executed by a computer comprising at least one processor further result in transmitting the converted signals to a control unit of a tire pressure monitoring system, and wherein the signals transmitted to the tire pressure monitoring system include an indication of whether signals indicative of tire pressure are converted in one of the first range and the second range.

17. A tire pressure monitoring system in a vehicle, comprising:
   a pressure sensor configured for monitoring tire pressure and generating signals indicative thereof,
   a processing unit and memory device including suitable software for:
   defining a first pressure range and a second pressure range,
   determining at least one of whether the tire pressure measured by the pressure sensor triggers the first pressure range or second pressure range and whether to notify the user that the tire pressure sensed by the pressure sensor is outside of the second pressure range,
   wherein in the first pressure range the signals are converted according to a first conversion variable and in the second pressure range the signals are converted according to a second conversion variable, wherein the first and second conversion variables are of a type selected from the group consisting of a resolution, a scaling factor, and an offset, wherein the first and second conversion variables are of the same type and wherein at least one of the first and second conversion variables is configured to be suitable for a particular application of a vehicle control unit, wherein the tire pressure monitoring system wheel unit is a single tire pressure monitoring system wheel unit;
   a wireless transmitter configured to transmit the converted the signals; and
   a tire pressure monitoring system control unit configured to receive the converted signals from the transmitter.

18. The tire pressure monitoring system in a vehicle as described in claim 17, wherein once the tire pressure triggers the second pressure range the processor continually converts the signals according to the second conversion variable until the tire pressure triggers the second pressure range.

19. The tire pressure monitoring system in a vehicle as described in claim 17, wherein the first conversion variable includes a first scaling factor and the second conversion variable includes a second scaling factor, the second scaling factor being different than the first scaling factor.

20. The tire pressure monitoring system in a vehicle as described in claim 17, wherein at least one of the first conversion variable and the second conversion variable includes at least one of a scaling factor and an offset.

* * * * *